(12) United States Patent
You et al.

(10) Patent No.: US 11,537,495 B2
(45) Date of Patent: Dec. 27, 2022

(54) SYSTEMS AND METHODS FOR ALTERING A GRAPHICAL USER INTERFACE

(71) Applicant: Walmart Apollo, LLC, Bentonville, AR (US)

(72) Inventors: Jiwen You, Sunnyvale, CA (US); Sinduja Subramaniam, San Jose, CA (US); Aleksandra Cerekovic, Sunnyvale, CA (US); Evren Korpeoglu, San Jose, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/163,484

(22) Filed: Jan. 31, 2021

(65) Prior Publication Data

US 2022/0245047 A1  Aug. 4, 2022

(51) Int. Cl.
  *G06F 11/34* (2006.01)
  *G06K 9/62* (2022.01)
  (Continued)

(52) U.S. Cl.
  CPC .......... *G06F 11/3438* (2013.01); *G06F 9/451* (2018.02); *G06F 16/9536* (2019.01);
  (Continued)

(58) Field of Classification Search
  CPC .. G06F 11/3438; G06F 9/451; G06F 16/9536; G06F 17/16; G06K 9/628;
  (Continued)

(56) References Cited

U.S. PATENT DOCUMENTS 6,266,649 B1  7/2001 Linden et al.
8,965,998 B1  2/2015 Dicker et al.
(Continued)

FOREIGN PATENT DOCUMENTS

WO  2011109219  9/2011
WO  2019148199  8/2019

OTHER PUBLICATIONS

Nayak et al., "Session-Based Recommender Systems for Action Selection in GUI Test Generation", Oct. 24-28, 2020, IEEE International Conference on Software Testing, Verification and Validation Workshops (ICSTW). (Year: 2020).*
(Continued)

*Primary Examiner* — Arvin Eskandarnia
*Assistant Examiner* — Chhian (Amy) Ling
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform: receiving in-session user activity entered into an initial graphical user interface (GUI) from a user electronic device of a user; selectively aggregating the in-session user activity of the user with historical activity data of the user; predicting one or more intents of the user by inputting the in-session user activity of the user and the historical activity data of the user into a first set of predictive algorithms; post-processing the one or more intents; and coordinating displaying an altered GUI based on the one or more intents, as filtered. Other embodiments are disclosed herein.

20 Claims, 8 Drawing Sheets

(51) Int. Cl.
*G06N 20/00* (2019.01)
*G06N 3/02* (2006.01)
*G06N 3/08* (2006.01)
*G06F 16/9536* (2019.01)
*G06F 9/451* (2018.01)
*H04L 67/50* (2022.01)
*G06F 17/16* (2006.01)

(52) U.S. Cl.
CPC .............. *G06F 17/16* (2013.01); *G06K 9/628* (2013.01); *G06N 3/02* (2013.01); *G06N 3/08* (2013.01); *G06N 20/00* (2019.01); *H04L 67/535* (2022.05)

(58) Field of Classification Search
CPC . G06N 3/02; G06N 3/08; G06N 20/00; H04L 67/22; H04L 67/535
See application file for complete search history.

(56) References Cited

U.S. PATENT DOCUMENTS

| | | | |
|---|---|---|---|
| 9,661,088 | B2 | 5/2017 | Krishnamoorthy et al. |
| 9,946,437 | B2 | 4/2018 | Anbil et al. |
| 10,776,444 | B1 | 9/2020 | Bailey et al. |
| 10,853,385 | B1 | 12/2020 | Truong et al. |
| 10,970,329 | B1 | 4/2021 | Al Majid et al. |
| 11,082,509 | B1 * | 8/2021 | Bandari .................. H04L 67/22 |
| 2015/0007065 | A1 * | 1/2015 | Krishnamoorthy ... G06F 3/0483 715/760 |
| 2015/0046841 | A1 | 2/2015 | Sharon et al. |
| 2015/0286645 | A1 * | 10/2015 | Sinha .................. G06F 16/9535 707/734 |
| 2016/0034809 | A1 | 2/2016 | Trenholm et al. |
| 2017/0206431 | A1 | 7/2017 | Sun et al. |
| 2017/0251081 | A1 | 8/2017 | Roychowdhury et al. |
| 2018/0341839 | A1 | 11/2018 | Malak et al. |
| 2019/0042981 | A1 * | 2/2019 | Bendfeldt ............... G06F 9/451 |
| 2019/0205472 | A1 * | 7/2019 | Kulkarni .............. G06F 16/9535 |
| 2020/0034911 | A1 | 1/2020 | Sriram et al. |
| 2020/0097725 | A1 | 3/2020 | Mietke |
| 2020/0159862 | A1 | 5/2020 | Kleiner et al. |
| 2020/0341602 | A1 | 10/2020 | Schoppe et al. |
| 2021/0124468 | A1 | 4/2021 | Song et al. |
| 2021/0406838 | A1 * | 12/2021 | Ramanath ............. G06F 16/958 |

OTHER PUBLICATIONS

Trofimov, I., "Inferring Complementary Products From Baskets and Browsing Sessions," arXiv:1809.09621v1 [cs.IR], published Sep. 25, 2018, 8 pgs. Sep. 25, 2018.

Hao, J., et al., "P-Companion: A Principled Framework for Diversified Complementary Product Recommendation," CIKM'20, Oct. 19-23, 2020, virtual, 8 pgs. Oct. 19, 2020.

Barkan, O. and Koenigstein, N., "ITEM2VEC: Neural Item Embedding for Collaborative Filtering," 2016 IEEE 26th International Workshop on Machine Learning for Signal Processing (MLSP) (2016) 6 pgs. 2016.

Pointwise mutual informatoin; Apr. 7, 2020; Wikipedia; pp. 1-5 Apr. 7, 2020.

\* cited by examiner

SYSTEMS AND METHODS FOR ALTERING A GRAPHICAL USER INTERFACE

TECHNICAL FIELD

This disclosure relates generally to graphical user interface technologies, and more particular to the creation of graphical user interfaces optimized based on a predicted intent of the user.

BACKGROUND

Graphical user interfaces ("GUIs") are integral to the operation of modern-day computer systems. Before their creation, text based user interfaces ("TUIs") (e.g., MS-DOS, Unix, etc.) excluded a large population of non-technical users from operating computer terminals due to the complexity of operating TUIs. Non-technical users would memorize or consult a chart of clunky, text-based commands and laboriously enter these commands into the TUI in order to operate a computer terminal. This changed with the advent of early GUIs, which allowed a non-technical user to operate a computer terminal using a mouse and without text based commands.

Early GUIs, though, posed their own problems. Many times, commands a user wanted to execute were buried in the GUI within a sub-menu accessible only after repeated inputs into the GUI (e.g., a drop down menu, a different tab, a different screen of the GUI, etc.). This, then, lead to user frustration and the inability of the user to use these desired commands. One solution to this problem is to make every command accessible on a GUI without sub-menus, but this poses its own problems. For example, many modern computer systems simply have too many commands to display them all without sub-menus. Further, the advent of computing on mobile devices, many of which have small displays, has made this solution impractical or impossible.

More recently, predictive algorithms have been used to customize commands displayed on GUIs based on historical user activity. For example, many GUIs will consider historical usage patterns and display GUI elements for frequently used commands. This blunderbuss approach to GUI customization, though, can cause frequently used commands to overpopulate the GUI and push out other relevant commands. Further, past approaches do not consider an intent of a user to utilize a specific command during specific usage session.

Therefore, in view of the above, there is a need for an improved GUI that predicts and displays relevant GUI elements.

BRIEF DESCRIPTION OF THE DRAWINGS

To facilitate further description of the embodiments, the following drawings are provided in which.

Figure 1:
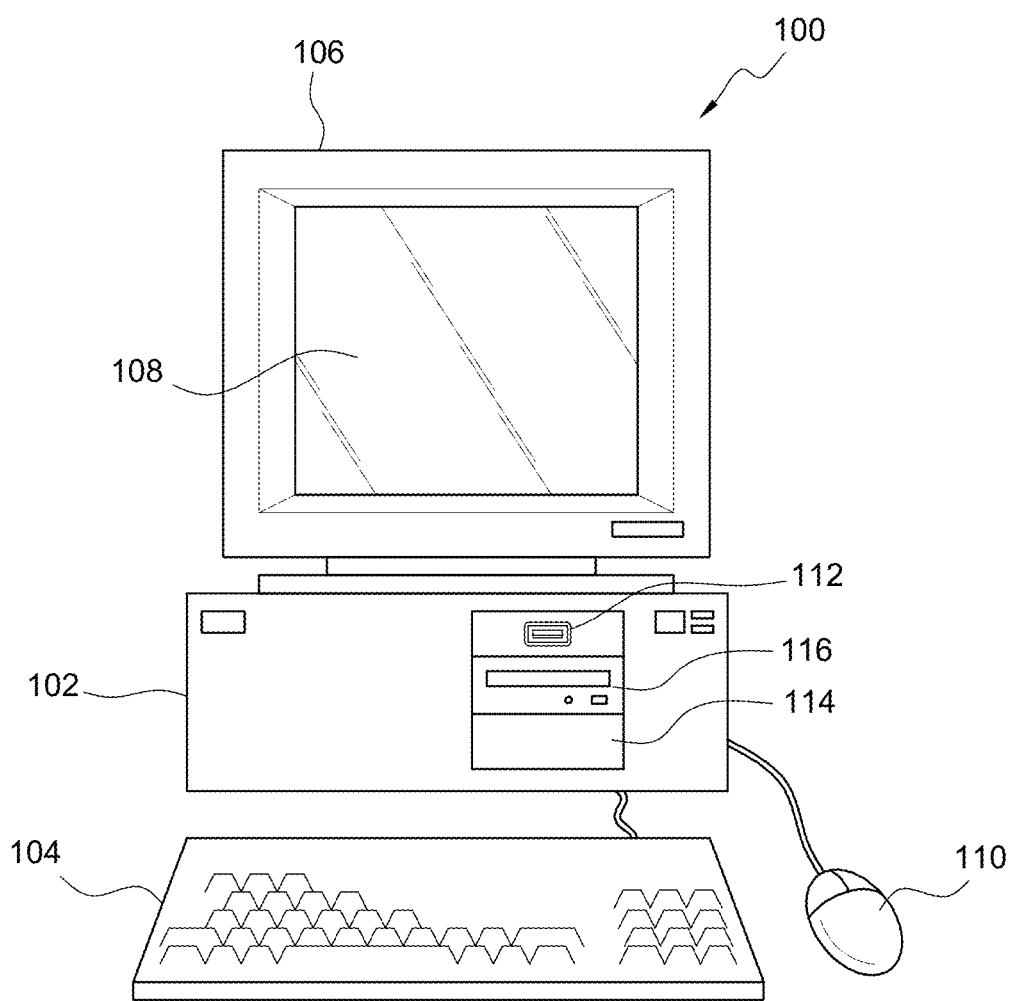
FIG. 1 illustrates a front elevational view of a computer system that is suitable for implementing various embodiments of the systems disclosed in FIGS. 3 and 6-7.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving in-session user activity entered into an initial graphical user interface (GUI) from a user electronic device of a user; selectively aggregating the in-session user activity of the user with historical activity data of the user; predicting one or more intents of the user by inputting the in-session user activity of the user and the historical activity data of the user into a first set of predictive algorithms; post-processing the one or more intents; and coordinating displaying an altered GUI based on the one or more intents, as filtered.

Various embodiments include a method. The method can be implemented via execution of computing instructions configured to run at one or more processors and configured to be stored at non-transitory computer-readable media The method can comprise receiving in-session user activity entered into an initial graphical user interface (GUI) from a user electronic device of a user; selectively aggregating the in-session user activity of the user with historical activity data of the user; predicting one or more intents of the user by inputting the in-session user activity of the user and the historical activity data of the user into a first set of predictive algorithms; post-processing the one or more intents; and coordinating displaying an altered GUI based on the one or more intents, as filtered.

Figure 2:
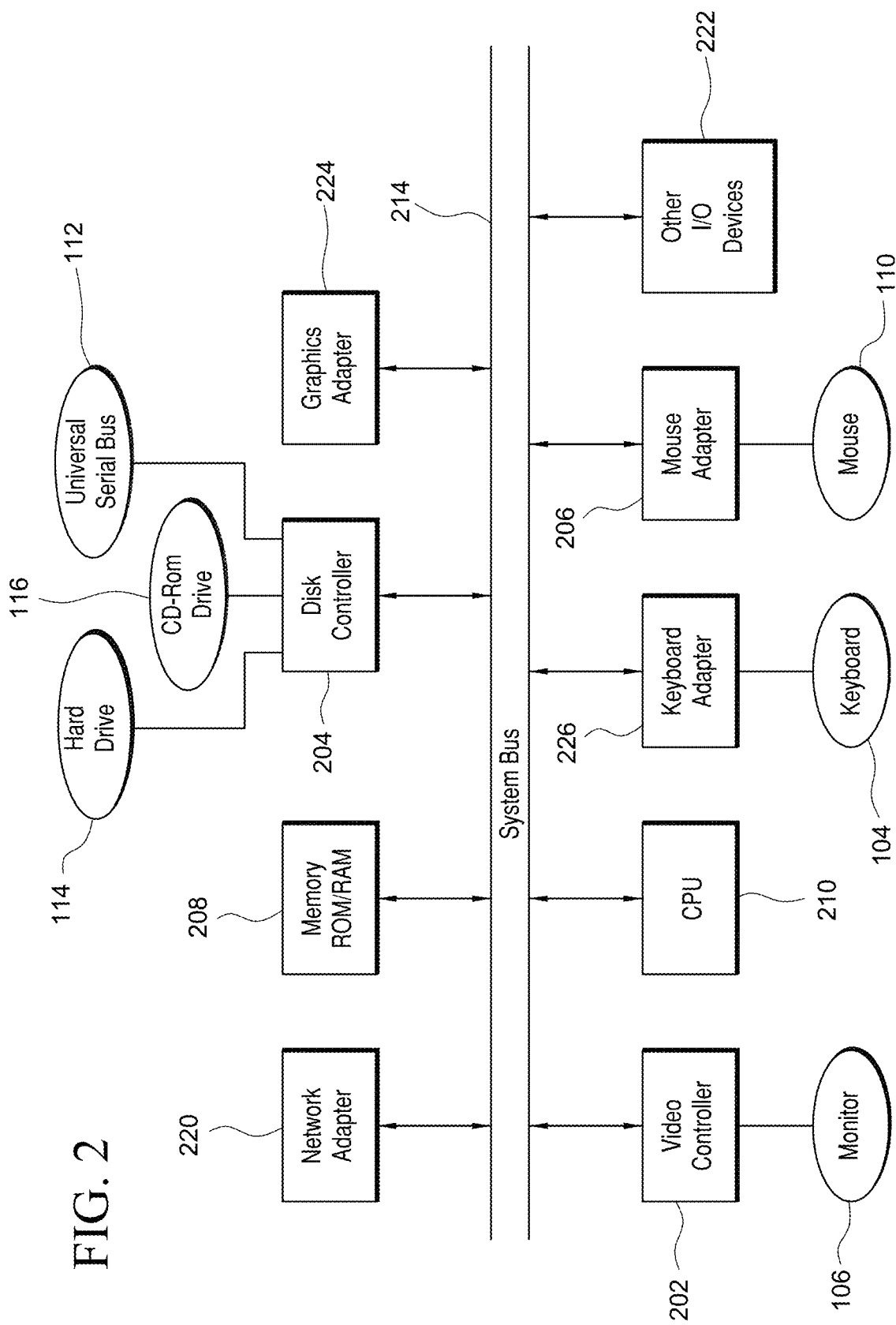
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
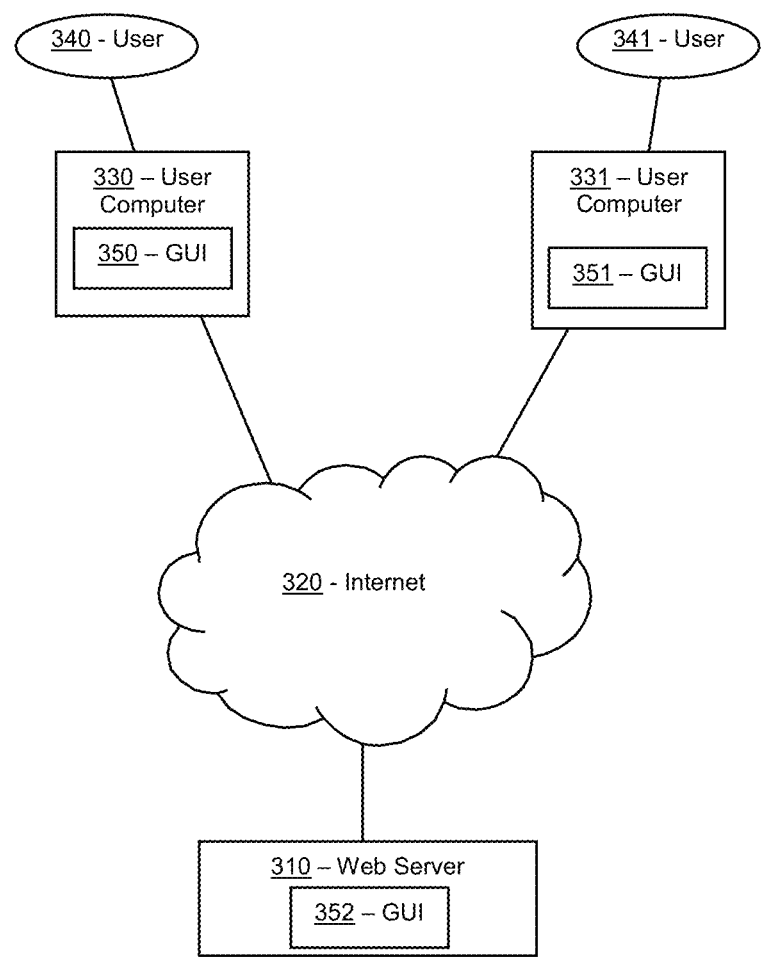
FIG. 3 illustrates a representative block diagram of a system, according to an embodiment.

Turning ahead in the drawings, FIG. 3 illustrates a block diagram of a system 300 that can be employed for altering a GUI, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310. Additional details regarding web server 310 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise GUI 350, 351, 352. In the same or different embodiments, GUI 350, 351, 352 can be part of and/or displayed by user computers 330, 331, which also can be part of system 300. In some embodiments, GUI 350, 351, 352 can comprise text and/or graphics (images) based user interfaces. In the same or different embodiments, GUI 350, 351, 352 can comprise a heads up display ("HUD"). When GUI 350, 351, 352 comprises a HUD, GUI 350, 351, 352 can be projected onto a medium (e.g., glass, plastic, etc.), displayed in midair as a hologram, or displayed on a display (e.g., monitor 106 (FIG. 1)). In various embodiments, GUI 350, 351, 352 can be color, black and white, and/or greyscale. In many embodiments, GUI 350, 351, 352 can comprise an application running on a computer system, such as computer system 100 (FIG. 1), user computers 330, 331, and/or web server 310. In the same or different embodiments, GUI 350, 351, 352 can comprise a website accessed through internet 320. In some embodiments, GUI 350, 351, 352 can comprise an eCommerce website. In these or other embodiments, GUI 352 can comprise an administrative (e.g., back end) GUI allowing an administrator to modify and/or change one or more settings in system 300. In the same or different embodiments, GUI 350, 351, 352 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc. In many embodiments, GUI 350, 351, 352 can comprise one or more GUI elements. In these or other embodiments, a GUI element can comprise a customizable portion of a GUI (e.g., a button, a text entry box, a hyperlink, an image, a text block, etc.). In various embodiments, a GUI element can be selectable by a user 340, 341 and/or interactive.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310 and user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG.

1). The input device(s) and the display device(s) can be coupled to the processing module(s) and/or the memory storage module(s) of web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or user computers 330, 331. In a similar manner, the processing module(s) and the memory storage module(s) can be local and/or remote to each other.

In many embodiments, web server 310 and/or user computers 330, 331 can be configured to communicate with one another. In various embodiments, web server 310 and/or user computers 330, 331 can communicate or interface (e.g., interact) with each other through a network or internet 320. In these or other embodiments, internet 320 can be an intranet that is not open to the public. In further embodiments, Internet 320 can be a mesh network of individual systems. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 331 also can be configured to communicate with one or more databases. In various embodiments, one or more databases can comprise a product database that contains information about products, items, or SKUs (stock keeping units) sold by a retailer. In many embodiments, one or more databases can comprise information about interactions of user computers 330, 331 with GUIs 350, 351. For example, the one or more databases can store past (e.g., historical) interactions of user computers 330, 331 with GUIs 350, 351. In many embodiments, interactions can be tied to a unique identifier (e.g., an IP address, an advertising ID, device ID, etc.) and/or a user account. In embodiments where a user 340, 341 interacts with GUIs 350, 351 before logging into a user account, data stored in the one or more database that is associated with a unique identifier can be merged with and/or associated with data associated with the user account. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). In some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

In many embodiments, one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for an improved GUI that executes commands faster by predicting an intent of a user session and displaying GUI elements directed toward accomplishing that intent. Further, these techniques can allow non-technical users to operate a computer terminal without technical knowledge possessed by a skilled artisan.

In many embodiments, the techniques described herein can also provide for a significant improvement over conventional approaches of generating GUIs, such as displaying frequently accessed GUI elements. In many embodiments, the techniques described herein can beneficially make determinations based on dynamic information that describes current conditions and/or conditions that have occurred during a single user session. In this way, the techniques described herein can avoid problems with stale and/or outdated data by continually updating during the single user session.

In a number of embodiments, the techniques described herein can solve a technical problem that arises only within the realm of computer networks, as GUIs do not exist outside the realm of computer networks.

Figure 4:
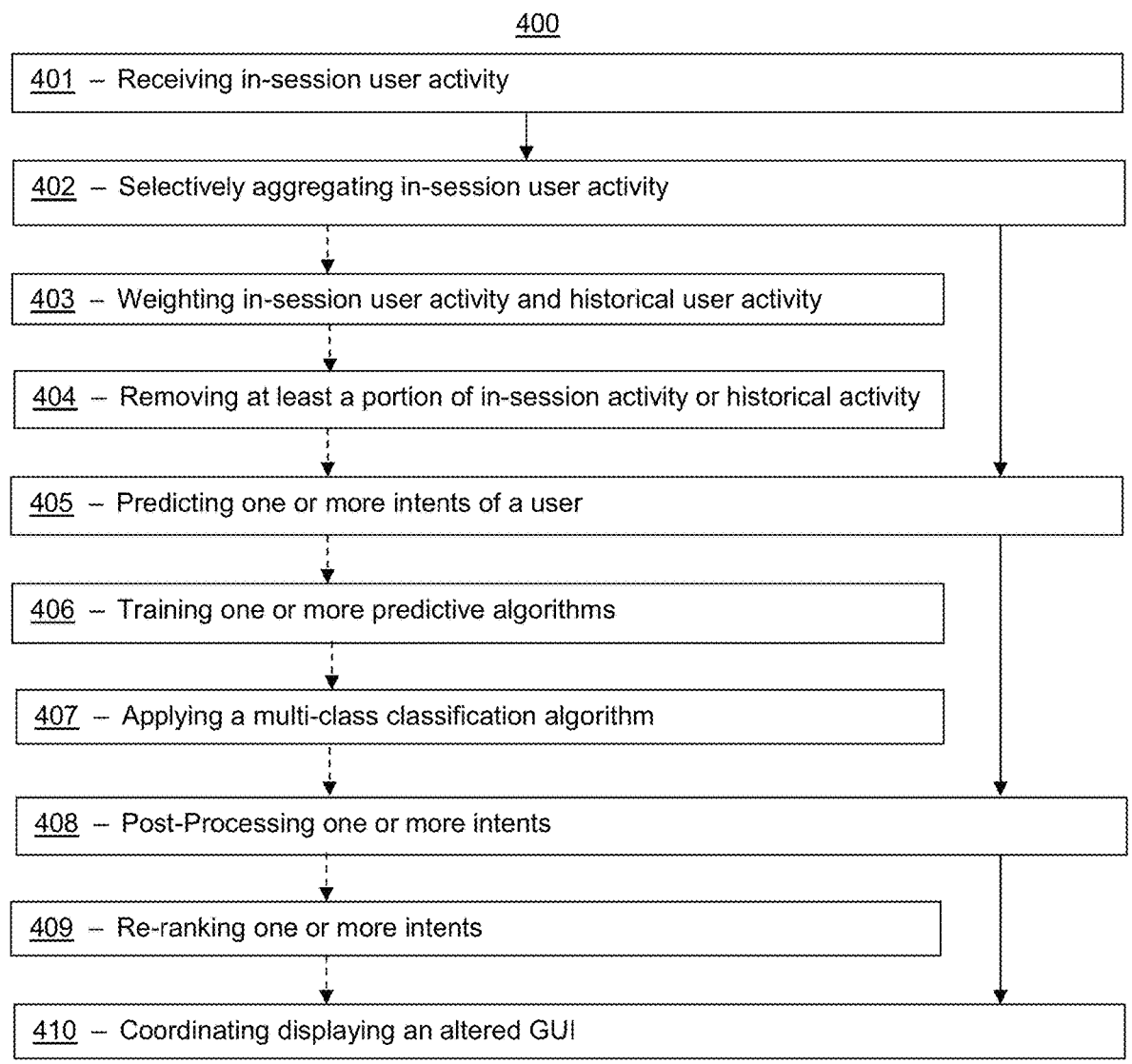
FIG. 4 illustrates a flowchart for a method, according to certain embodiments.
Figure 5:
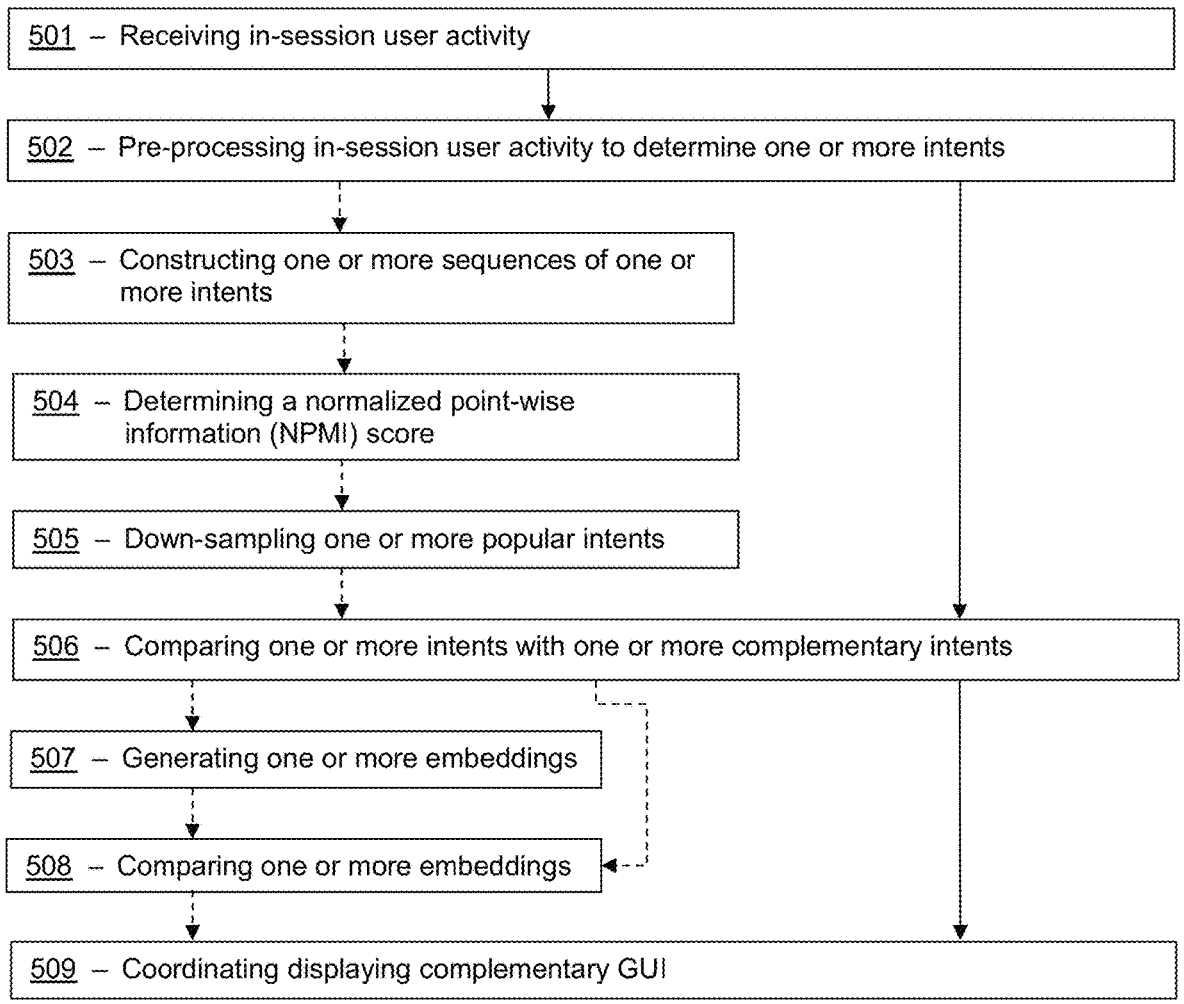
FIG. 5 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or user computers 330, 331 (FIG. 3). The processing module(s) can be similar or identical to the processing module(s) described above with respect to computer system 100 (FIG. 1). In some embodiments, method 400 can be performed in parallel, before, after, or as a part of method 500 (FIG. 5). In various embodiments, one or more activities of method 400 can be inserted into and/or combined with all of or portions of method 500 (FIG. 5). For example, method 400 can be used to generate a first GUI element on a GUI while method 500 (FIG. 5) can be used to generate a second GUI element.

In many embodiments, method 400 can comprise an activity 401 of receiving in-session user activity. In various embodiments, in-session user activity can comprise interactions with a GUI that occur during a user session. For example, in-session user activity can comprise interactions with a web site during a browsing session on the website. As another example, in-session user activity can comprise interactions with a computer program that occur beginning from when the program is opened to when the program is closed. It will be understood that while many user sessions end when a GUI is closed (e.g., by navigating away from a website or closing a program), user sessions can persist after closure of the GUI. For example, it can be considered one user session when a user opens a GUI, closes the GUI, and then a short time later re-opens the GUI. What is considered a user session can be determined by an administrator of system 300 (FIG. 3) based on the specifications and/or constraints of the system and its administrator. In many embodiments, in-session user activity can be continually streamed to a database and/or a cache for storage and further processing. This cached in-session user activity can then be quickly accessed on demand to create a GUI customized to the specific user session. In various embodiments, user activity can be entered into an initial GUI. As described herein, an "initial GUI" need not be restricted to a GUI displayed when a user initially opens the GUI. "Initial GUI" is merely used to differentiate the initial GUI from subsequent GUIs (e.g., an altered GUI described in activity 411 below). For example, an initial GUI can be displayed in the middle and/or at the end of a user session. As another example, an altered GUI (as described in activity 411 below) can become an initial GUI when it is further altered according to the techniques described herein.

In many embodiments, method 400 can comprise an activity 402 of selectively aggregating in-session user activity. In some embodiments, in-session user activity can be selectively aggregated with historical user activity. In various embodiments, historical user activity can comprise in-person user activity and/or the interactions with GUIs described above. For example, when an operator of a website also owns a building (e.g., a brick and mortar store), actions of a user can be tracked while the user is in the building. These in-building actions can then be categorized, stored in a database as historical activities, and then retrieved by one or more components of system 300 (FIG. 3) for use in the techniques described herein. In various embodiments, selectively aggregating in-session and/or historical activity can comprise sorting the in-session activity and/or the historical activity into groups. In these embodiments, the in-session and/or the historical activity can be grouped by, recency of interactions (e.g., interactions made during a previous month, previous week, previous day, previous hour, etc.), a categorization level in a hierarchical categorization scheme of an item that is the subject of an interaction (e.g., an item type, a sub-department, a department, a super-department, etc.) type of interaction (a click, a look, a selection, a grab, an add to cart, a view, a purchase, a bid, a swipe, a pinch, a reverse pinch, etc.), and/or a distribution of interaction counts in a categorization level of a hierarchical categorization scheme (e.g. interaction counts made a week ago in an item type of "baby blankets" by an individual user can be grouped with respect to an overall distribution of interactions made a week ago by multiple users in the item type of "baby blankets"). These groups can then be further processed and/or fed to downstream predictive algorithms as an input, and an altered GUI can be generated that is directed to a user intent within that specific group of interactions. In many embodiments, selectively aggregating in-session activity and/or historical activity can comprise altering at least one of the in-session activity or the historical activity.

In some embodiments, method 400 can optionally comprise activity 403 of weighting in-session user activity and historical user activity. In various embodiments, activity 403 can be performed at the same time or as a part of activity 402 and/or activity 404. In some embodiments, activity 403 can be performed after activity 404. In various embodiments, portions of in-session activity or historical activity can be removed from consideration by downstream predictive algorithms according to one or more rules based algorithms. In these or other embodiments, portions of in-session activity or historical activity can be weighted such that their influence on downstream predictive algorithms is increased or decreased depending on the weighting. In many embodiments, weights can be used when training downstream predictive models. In these or other embodiments, weights can be used to increase a probability of altering a GUI in a specific way or in order to target a specific user intent.

For example, in-session activity or historical activity can be weighted according to a price of an item interacted with. In this way, cheaper items (e.g., consumables that are frequently purchased) do not have a skewing effect on downstream predictive algorithms.

In some embodiments, method 400 can optionally comprise activity 404 of removing at least a portion of in-session activity and historical user activity. In various embodiments, activity 404 can be performed at the same time or as a part of activity 402 and/or activity 403. In some embodiments, activity 404 can be performed before activity 403. In many embodiments, in-session activity and historical activity can be removed from consideration by downstream predictive algorithms. In this way, a more accurate prediction can be made by minimizing and/or removing noise from the prediction. Removing portions of in-session activity or historical activity from consideration can be accomplished in a number of ways. For example, portions of the in-session activity or the historical activity can be removed when a user accesses a GUI via a specific access portal (e.g., an application, a website, a mobile device, a desktop computer, a wearable user device, a specific type of operating system, etc.). In this way, repetitive commands that are performed via a specific access portal can be removed from consideration by downstream predictive algorithms. In a more specific example, portions of in-session activity or historical activity can be removed from consideration when a user accesses a specific portion of an access portal (e.g., activity data for a furniture access portal can be removed from consideration when a user accesses a grocery access portal). In this way, irrelevant commands that are performed via a specific access portal can be removed from consideration by downstream predictive algorithms operating on a different access portal.

In many embodiments, specific actions in in-session activity or historical activity can be removed because it is unlikely that the action will be performed twice in a predetermined amount of time. For example, a GUI for a smart home can remove a "lock front door" command from in-session activity. As another example, a purchase of a television can be removed from historical activity. In these or other embodiments, a complementary action can be added to in-session activity or historical activity in response to specific actions. To continue with the example above, a "lock back door" command and a purchase TV stand command (e.g., an advertisement for a television) can be added for consideration by a downstream predictive algorithm. In many embodiments, a complementary action can be determined according to method 500 (FIG. 5). In these or other embodiments, a whitelist can be created In many embodiments, method 400 can comprise an activity 405 of predicting one or more intents of a user. In some embodiments, an intent of a user can be predicted using a first set of predictive algorithms. In these or other embodiments, an input for a predictive algorithm can comprise in-session activity and/or historical activity. In various embodiments, the in-session activity and/or the historical activity can be aggregated (e.g., selectively aggregated) as described above before being inputted into a predictive algorithm. In some embodiments, a first set of predictive algorithms can comprise one or more machine learning algorithms. In these or other embodiments, in-session activity and/or historical activity can be converted into vector format before being inputted into a predictive algorithm. In many embodiments, a vector can be constructed by incrementing a count in an activity database that tracks a specific action. For example, Table 1 below shows an exemplary embodiment of a portion of an activity database with narrative descriptions added. It will be understood that these narrative descriptions can be replaced by various identifiers (e.g., a key value) that can be understood by a computer system (e.g., system 100 (FIG. 1)).

TABLE 1

| Activity Type | Categorization of GUI element (e.g. product type) | In-session activity | Historical activity Activity past week | Activity past month |
|---|---|---|---|---|
| Views | Baby Blankets | 0 | 3 | 0 |
| Add to Carts | Baby Blankets | 0 | 1 | 0 |
| Purchase | Baby Blankets | 0 | 0 | 0 |

In some embodiments, method 400 can optionally comprise activity 406 of training one or more predictive algorithms. In some embodiments, training a predictive algorithm can comprise estimating internal parameters of a model configured to determine an intent of a user while interacting with a GUI. In various embodiments, a predictive algorithm can be trained using labeled training data, otherwise known as a training dataset. In many embodiments, a training dataset can comprise all or a part of in-session activity and/or historical activity. In the same or different embodiments, a predictive algorithm can comprise a multiclass classifier, a logistic regressor, a tree-based model (e.g., XGBoost), a learning to rank framework (e.g., LambdaRank), and/or other suitable predictive models. In the same or different embodiments, a pre-trained predictive algorithm can be used, and the pre-trained algorithm can be re-trained on the labeled training data. In many embodiments, a predictive algorithm can be iteratively trained in real time as data is added to a training data set (e.g., as a user interacts with a GUI in a user session). In various embodiments, a predictive algorithm can be trained, at least in part, on a single user's (e.g., user 340 (FIG. 3)) interaction data or the single user's interaction data can be weighted in a larger training data set. In this way, a predictive algorithm tailored to a single user can be generated. In the same or different embodiments, a predictive algorithm tailored to a single user can be used as a pre-trained algorithm for a similar user. In many embodiments, a predictive algorithm can be trained, at least in part, on interaction data for a single category of GUI element or the single category of GUI element's interaction data can be weighted in a larger training data set. For example, in-session activity and/or historical activity for an item type that is frequently purchased (e.g. bananas) can be weighted down based on one or more of price or access portal. In this way, a skewing effect on downstream predictive algorithms can be avoided for items that are frequently purchased. In this way, a predictive algorithm tailored to a type of user (e.g. a user who is buying non-grocery items) can be generated. In several embodiments, due to a large amount of data used to create and maintain a training data set, a predictive algorithm can use extensive data inputs to determine an intent. Due to these extensive data inputs, in many embodiments, creating, training, and/or using a predictive algorithm configured to determine an intent cannot practically be performed in a mind of a human being.

In some embodiments, method 400 can optionally comprise activity 407 of applying a multi-class classification algorithm. In various embodiments, activity 407 can be performed at the same time or as a part of 405 and/or 406. In these or other embodiments, a multi-class classification model can comprise an algorithmic and/or mathematical model configured to predict probabilities of multiple outcomes. For example, a multi-class classification model can predict one or more probabilities that a user displays one or more intents to perform one or more different actions on a GUI. In many embodiments, a multi-class classification model can model one or more categorically distributed dependent variables (e.g., one or more intents) based on one or given a set of independent variables (e.g., in-session activity and/or historical activity). In some embodiments, a multi-class classification algorithm can comprise one or more logistic regressors configured to determine an identity of one or more categorically distributed dependent variables given a set of independent variables. In many embodiments, a logistic regressor can use an equation comprising:

$$P_{action_{Pti}} = \begin{cases} 0, & \text{if } X \text{ is null vector} \\ \frac{1}{(1 - e^{-W*X^T})}, & \text{otherwise} \end{cases}$$

In these or other embodiments, $P_{action_{Pti}}$ can comprise a likelihood of a user performing an action on a GUI (e.g., a probability of a user having an intent), X can comprise one or more user features (e.g., one or more vectors constructed from interactions with a GUI taken from in-session activity and/or historical activity), and W can comprise one or more leant weights of a model PTi for a complementary action space. For example a model PTi trained to predict a user's intent to purchase a television stand in a session can have features containing a user's in-session activity and/or historical activity with television items and/or furniture items.

In many embodiments, one or more user features can be pre-processed as described above with regards to activities 401-404. In various embodiments, one or more user features can be limited to actions that precede complementary actions predicted by $P_{action_{Pti}}$. In these or other embodiments, $P_{action_{Pti}}$ can comprise a ranked list of likely actions, and portion of a GUI can be modified in view of each of these likely actions. In many embodiments, $P_{action_{Pti}}$ can be set to 0 when X is a null vector. For example, continuing with the example above, a model PTi trained to predict an intent to purchase a television can have a null feature vector X for a user who only buys grocery items and does not interact with non-consumable products.

In many embodiments, method 400 can comprise an activity 408 of post-processing one or more intents. In these or other embodiments, post-processing one or more intents can comprise filtering out one or more non-relevant intents. In these or other embodiments, intents to perform an action can be removed from a ranked list of likely intents because they are unlikely to be performed twice in a predetermined amount of time (e.g., intents directed toward non-consumable products). For example, a GUI for a smart home can remove a "lock front door" command from in-session activity when it has been performed recently. As another example, an intent to purchase a television can be removed from a user's future intents when the user has recently purchased a television. In these or other embodiments, an intent can be removed from a ranked list when it was performed within a predetermined amount of time.

In some embodiments, method 400 can optionally comprise activity 409 of re-ranking one or more intents. In many embodiments, activity 409 can be performed at the same time as or as a part of activity 408. In various embodiments, activity 409 can be performed independently and/or in place of activity 408. In various embodiments, one or more intents can be re-ranked using a dot product of the one or more intents (e.g., using vectors representing the one or more intents).

In many embodiments, method 400 can comprise an activity 410 of coordinating displaying an altered GUI. As described herein, an "altered GUI" need not be restricted to a GUI displayed near an end of a user session. "Altered GUI" is merely used to differentiate the altered GUI from previous GUIs (e.g., an initial GUI described in activity 401 above). Further, an altered GUI need not be displayed immediately after an initial GUI (e.g., there can be intervening GUIs displayed between an initial GUI and an altered GUI). In various embodiments, an altered GUI can become an initial GUI and the techniques described herein can be repeated using the altered GUI as the initial GUI. In various embodiments, coordinating displaying an altered GUI can comprise customizing a GUI element. In the same or different embodiments, customizing a GUI element can comprise altering an image displayed on the GUI, altering text on the GUI, altering a layout of the GUI, changing a type of the GUI, displaying an advertisement on the GUI, displaying no advertisement on the GUI, altering a color displayed on the GUI, changing a web-module configured to generate one or more portions of the GUI, etc. In many embodiments, displaying an altered GUI can comprise displaying certain content at specific times. In these or other embodiments, a GUI element can comprise advertisements for products, services, and/or events. In various embodiments, an altered GUI transmitted for display during activity 410 can be related to a predicted intent or action of a user, as determined above. In many embodiments, a GUI transmitted for display during activity 410 can be optimized in order to facilitate a predicted intent of a user or "nudge" a user towards performing a predicted action. In many embodiments, a predicted action can be an action that is likely to be performed after an action performed in a user session (e.g., a complementary action). In these or other embodiments, an altered GUI can be configured to enable a user to more efficiently perform complex predicted actions on devices where accessing the predicted action would involve laborious navigation and/or complex on screen inputs. For example, commands that would normally be buried within sub-menus or subsequent GUIs can be added to an altered GUI in a prominent area. As another example, information used to perform predicted actions can be displayed in a summary form on an altered GUI.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules. Such non-transitory memory storage modules can be part of a computer system such as web server 310 and/or user computers 330, 331 (FIG. 3). The processing module(s) can be similar or identical to the processing module(s) described above with respect to computer system 100 (FIG. 1). In some embodiments, method 500 can be performed in parallel, before, after, or as a part of method 400 (FIG. 4). In various embodiments, one or more activities of method 500 can be inserted into and/or combined with all of or portions of method 400 (FIG. 4). In many embodiments, an output of one or more activities of method 500 can be used in method 400 (FIG. 4).

In many embodiments, method 500 can comprise an activity 501 of receiving in-session user activity. Activity 501 can be similar or identical to activity 401 (FIG. 4). In various embodiments, in-session user activity can comprise interactions with a GUI that occur during a user session. For example, in-session user activity can comprise interactions with a website during a browsing session on the website. As another example, in-session user activity can comprise interactions with a computer program that occur beginning from when the program is opened to when the program is closed. It will be understood that while many user sessions end when a GUI is closed (e.g., by navigating away from a website or closing a program), user sessions can persist after closure of the GUI. For example, it can be considered one user session when a user opens a GUI, closes the GUI, and then a short time later re-opens the GUI. What is considered a user session can be determined by an administrator of system 300 (FIG. 3) based on the specifications and/or constraints of the system and its administrator. In many embodiments, in-session user activity can be continually streamed to a database and/or a cache for storage and further processing. This cached in-session user activity can then be quickly accessed on demand to create a GUI customized to the specific user session. In various embodiments, user activity can be entered into an initial GUI. As described herein, an "initial GUI" need not be restricted to a GUI displayed when a user initially opens the GUI. "Initial GUI" is merely used to differentiate the initial GUI from subsequent GUIs (e.g., a complementary GUI described in activity 510 below). For example, an initial GUI can be displayed in the middle and/or at the end of a user session. As another example, a complementary GUI (as described in activity 510 below) can become an initial GUI when it is further altered according to techniques described herein.

In many embodiments, method 500 can comprise an activity 502 of pre-processing in-session user activity to determine one or more intents. In various embodiments, one or more intents can comprise an intent of a user to perform one or more actions on a GUI in a user session. In these or other embodiments, pre-processing in-session user activity can comprise altering in-session user activity to remove a bias towards at least one intent of one or more intents.

In some embodiments, method 500 can optionally comprise activity 503 of constructing one or more sequences of one or more intents. In many embodiments, activity 503 can be performed at the same time or as a part of activity 502. In these or other embodiments, a sequence of intents can comprise one or more actions on a GUI. In these or other embodiments, one or more sequences can be arranged in an order of performance. In many embodiments, actions that pertain to the same intent can be grouped together in a sequence of the intent. In some embodiments, actions can be grouped together based on a categorization of the actions. For example, consider an embodiment where a user adds shampoo, eggs, milk, and body lotion to an electronic basket. This group of actions can be separated into two sequences of intents based on the type of item added. Shampoo and body lotion can be placed in a first sequence because they both pertain to a personal care intent, while eggs and milk can be placed in a second sequence because they are grocery items. As another example, consider an embodiment where a user commands devices in his smart home to turn on the security camera, fill the bathtub, lock the front door, and dim the bathroom lights. Turning on the security camera and locking the front door can be placed in a first sequence because they both pertain to security measures, while filling the bathtub and dimming the bathroom lights can be placed in a second sequence because they both pertain to leisure activities.

In some embodiments, method 500 can optionally comprise activity 504 of determining a normalized point-wise mutual information (NPMI) score. In various embodiments, activity 504 can be performed before, after, as the same time as, and/or as part of activities 502-503. In many embodiments, an NPMI score can comprise a metric configured to convey a level of mutual information between two data sets (e.g., two GUI interactions and/or two sequences of GUI interactions). In many embodiments, an NPMI score can also convey a level of mutual dependence between the two data sets. For example, when an NPMI score is a value between −1 and 1, −1 can indicate exclusion (e.g., never occurring together), 0 can indicate independence (e.g., neither has an effect on the other), and 1 can indicate complete dependence (e.g., always occurring together). In various embodiments, a NPMI score can be calculated using a system of equations comprising:

$$pmi(x; y) = \log\frac{p(x, y)}{p(x)p(y)} = \log\frac{p(x|y)}{p(x)}$$

$$h(x, y) = -\log p(x, y)$$

$$npmi(x; y) = \log\frac{pmi(x; y)}{h(x, y)}$$

In these or other embodiments, x and y comprise action types, p(x) comprises a probability of a user performing an action type x, p(x, y) comprises a probability of a user performing an action type x and action type y in the same user session, pmi(x; y) comprises a point-wise mutual information of action type x and action type y, h(x, y) comprises joint self-information of action type x and action type y, and npmi(x; y) comprises normalized point-wise mutual information of action type x and action type y.

In many embodiments, an NPMI score can be calculated for all or a portion of possible combinations of user actions. For example, given a list of items in an electronic basket comprising shampoo, eggs, milk, and body lotion, an NPMI scores between shampoo and eggs, shampoo and milk shampoo and body lotion, eggs and milk, eggs, and body lotion, and milk and body lotion can be calculated. These items can then be grouped into different intents based on the NPMI score. To continue with this example, egg and milk are often purchased together, and therefore have a higher NPMI score than eggs and shampoo. In some embodiments, intents can be grouped together (e.g., be placed in a sequence together) when their NPMI score is above a predetermined threshold. In various embodiments, this threshold can be set by an administrator of method 500.

In some embodiments, method 500 can optionally comprise activity 505 down-sampling one or more popular intents. In various embodiments, activity 505 can be performed at the same time, before, after, and/or as a part of activities 502-504. In many embodiments, one or more popular intents can be determined using a historical activity for one or more individuals. In these or other embodiments, a top N number of intents in a historical activity can be weighted such that their influence on downstream predictive algorithms are lessened, removed from consideration, and/or simply downgraded by Y number of ranks in a ranked list of intents. In many embodiments, frequently occurring intents can be down-sampled.

In many embodiments, method 500 can comprise an activity 506 of comparing one or more intents with one or more complementary intents. In these or other embodiments, comparing an intent with a complimentary intent can comprise determining a similarity metric of between two or more intents. In some of these embodiments, two intents can be determined to be similar when the similarity metric is above a predetermined threshold. In many embodiments, a predetermined threshold can be set by an administrator of system 300 (FIG. 3). In various embodiments, a complementary intent can comprise an intent to perform an action complementary to one or more actions during a session. For example, if a user commands his smart home to lock the front door, a complementary action would be to turn on a security system because both of these actions are performed before the user goes to bed. As another example, if a user purchases a flat screen television, a complementary action would be to purchase a TV stand because they two items complement each other.

In some embodiments, method 500 can optionally comprise activity 507 of generating one or more embeddings. In many embodiments, activity 507 can be performed at the same time or as a part of activities 506 and 508. In various embodiments, embeddings can be generated from one or more intents and/or one or more actions performed within an intent. In these or other embodiments, an embedding can comprise a vector representation of the one or more intents and/or the one or more actions performed within an intent. In some embodiments, an embedding can be generated by inputting a user's historical action data into an algorithm configured to generate an embedding from the data. In many embodiments, one or more actions performed within an intent can be used to generate an embedding. For example, historical data for a category within a hierarchical categorization can be converted into embeddings using a Word2Vec skip-gram algorithm.

In some embodiments, an embedding can be stored in a data store configured to store high dimensional data. For example, high dimensional data can be stored in Facebook AI Similarity Search (AKA "Faiss") and/or Elastic Search. In the same or different embodiments, high dimensional data can comprise data having a large number of features, thereby leading to "the curse of dimensionality." In some embodiments, an embedding can be stored as a sparse representation in a data store configured to store high dimensional data. Storage efficiency can be improved by encapsulating embeddings into coarser, conceptual embeddings by storing them as a sparse representation. In some embodiments, a sparse representation of an embedding can store only non-zero counts for vectors in the embedding. This technique, then, can reduce the usage of storage space, and can consequently make subsequent reading and/or processing of the sparse representation of an embedding faster than reading and/or processing of embeddings that are not stored as a sparse representation. In many embodiments, this save in storage space and processing time can allow complex predictive models described herein to be performed on a mobile device.

Figure 8:
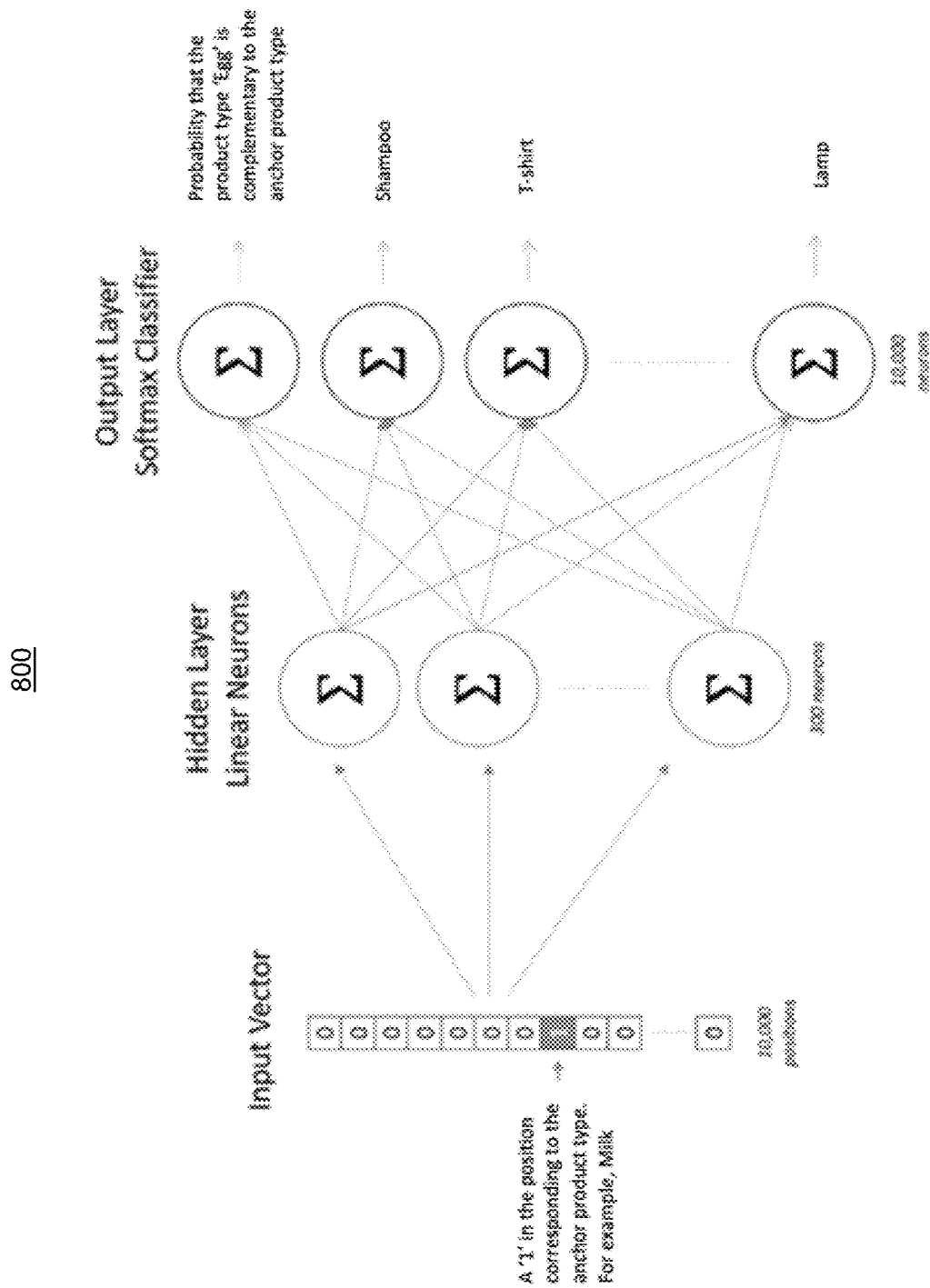
FIG. 8 illustrates a representative block diagram of a neural network, according to an embodiment.

In some embodiments, method 500 can optionally comprise activity 508 of comparing one or more embeddings. In many embodiments, activity 508 can be performed at the same time or as a part of activity 506 and/or 507. In these or other embodiments, comparing one or more embeddings can comprise determining a similarity metric of between two or more embeddings. In some of these embodiments, two embeddings can be determined to be similar when the similarity metric is above a predetermined threshold. In many embodiments, a predetermined threshold can be set by an administrator of system 300 (FIG. 3). In these or other embodiments, a similarity metric can be determined by inputting a vector into machine learning algorithm. In some embodiments, a machine learning algorithm can comprise a neural network. In many embodiments, a neural network can have one or more hidden layers and/or one or more non-hidden layers. In these or other embodiments, one or more hidden layers can comprise linear neurons (e.g., neurons in the neural network using a linear function as their rectifier). In various embodiments, one or more non-hidden layers can use a classification algorithm, as described above, as their rectifier. For example, FIG. 8 illustrates a neural network 800 that uses a Softmax classifier a rectifier for one or more non-hidden layers.

Referring back to FIG. 5, in many embodiments, method 500 can comprise an activity 509 of coordinating displaying a complementary GUI. Activity 509 can be similar to activity 410 (FIG. 4). As described herein, a "complementary GUI" need not be restricted to a GUI displayed near an end of a user session. "Complementary GUI" is merely used to differentiate the complementary GUI from previous GUIs (e.g., an initial GUI described in activity 501 above or an altered GUI described in activity 410 (FIG. 4)). Further, complementary GUI need not be displayed immediately after an initial GUI (e.g., there can be intervening GUIs displayed between an initial GUI and a complementary GUI). In various embodiments, a complementary GUI can become an initial GUI and the techniques described herein can be repeated using the complementary GUI as the initial GUI. In various embodiments, coordinating displaying a complementary GUI can comprise customizing a GUI element. In the same or different embodiments, customizing a GUI element can comprise altering an image displayed on the GUI, altering text on the GUI, altering a layout of the GUI, changing a type of the GUI, displaying an advertisement on the GUI, displaying no advertisement on the GUI, altering a color displayed on the GUI, changing a web-module configured to generate one or more portions of the GUI, etc. In many embodiments, displaying a complementary GUI can comprise displaying certain content at specific times. In these or other embodiments, a GUI element can comprise advertisements for products, services, and/or events. In various embodiments, a complementary GUI transmitted for display during activity 509 can be related to a predicted intent or action of a user, as determined above. In many embodiments, a GUI transmitted for display during activity 509 can be optimized in order to facilitate a predicted intent of a user or "nudge" a user towards performing a predicted action. In many embodiments, a predicted action can be an action is that likely to be performed after an action performed in a user session (e.g., a complementary action). In these or other embodiments, a complementary GUI can be configured to enable a user to more efficiently perform complex predicted actions on devices where accessing the predicted action would involve laborious navigation and/or complex on screen inputs. For example, commands that would normally be buried within sub-menus or subsequent GUIs can be added to a complementary GUI in a prominent area. As another example, information used to perform predicted actions can be displayed in a summary form on an altered GUI.

Figure 6:
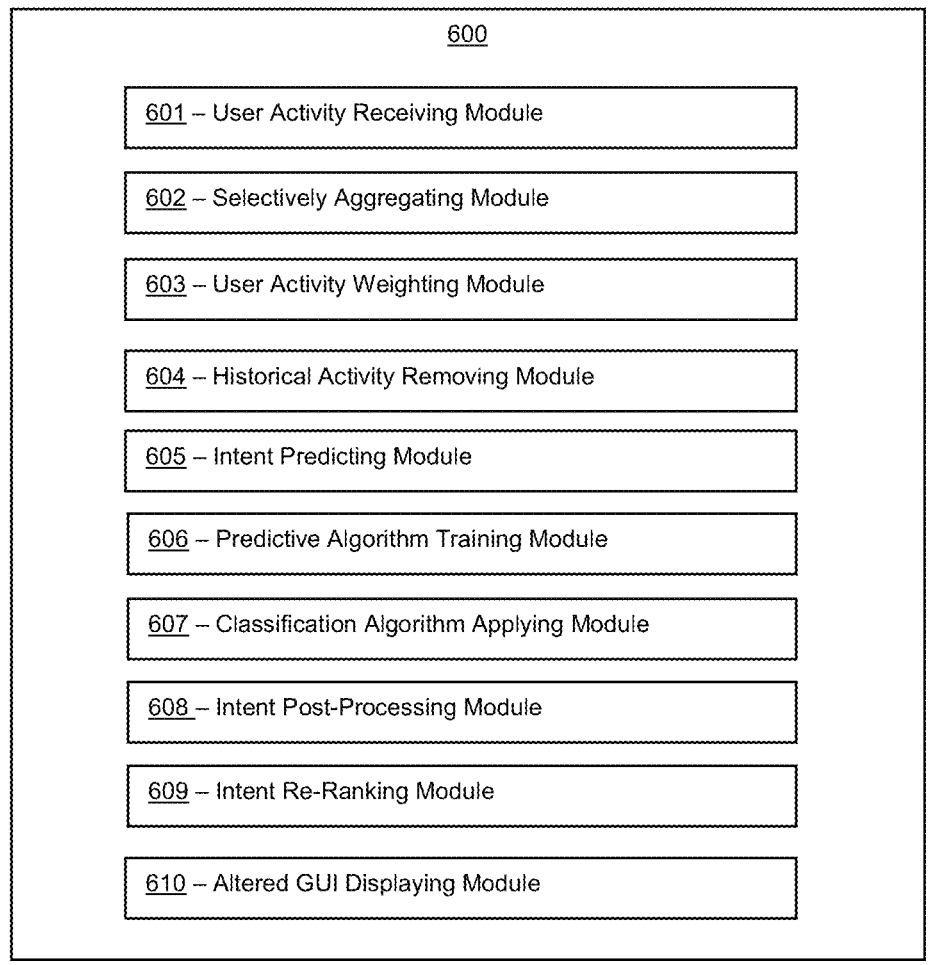
FIG. 6 illustrates a representative block diagram of a system, according to an additional embodiment.

Turning ahead in the drawings, FIG. 6 illustrates a block diagram of a system 600 that can be employed for altering a GUI. System 600 is merely exemplary and embodiments of the system are not limited to the embodiments presented herein. System 600 can be employed in many different embodiments or examples not specifically depicted or described herein. In some embodiments, certain elements or modules of system 600 can perform various procedures, processes, and/or activities. In these or other embodiments, the procedures, processes, and/or activities can be performed by other suitable elements or modules of system 600. In many embodiments, system 600 (or a portion thereof) can be stored within web server 310 (FIG. 3) and/or user device 330 (FIG. 3).

Generally, therefore, system 600 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 600 described herein.

In many embodiments, system 600 can comprise non-transitory memory storage module 601. Memory storage module 601 can be referred to as user activity receiving module 601. In many embodiments, user activity receiving module 601 can store computing instructions configured to run on one or more processing modules and perform one or more acts of method 400 (FIG. 4) (e.g., activity 401 (FIG. 4)).

In many embodiments, system 600 can comprise non-transitory memory storage module 602. Memory storage module 602 can be referred to as selectively aggregating module 602. In many embodiments, selectively aggregating module 602 can store computing instructions configured to run on one or more processing modules and perform one or more acts of method 400 (FIG. 4) (e.g., activity 402 (FIG. 4)).

In many embodiments, system 600 can comprise non-transitory memory storage module 603. Memory storage module 603 can be referred to as user activity weighting module 603. In many embodiments, user activity weighting module 603 can store computing instructions configured to run on one or more processing modules and perform one or more acts of method 400 (FIG. 4) (e.g., activity 403 (FIG. 4)).

In many embodiments, system 600 can comprise non-transitory memory storage module 604. Memory storage module 604 can be referred to as historical activity removing module 604. In many embodiments, historical activity removing module 604 can store computing instructions configured to run on one or more processing modules and perform one or more acts of method 400 (FIG. 4) (e.g., activity 404 (FIG. 4)).

In many embodiments, system 600 can comprise non-transitory memory storage module 605. Memory storage module 605 can be referred to as intent predicting module 605. In many embodiments, intent predicting module 605 can store computing instructions configured to run on one or more processing modules and perform one or more acts of method 400 (FIG. 4) (e.g., activity 405 (FIG. 4)).

In many embodiments, system 600 can comprise non-transitory memory storage module 606. Memory storage module 606 can be referred to as predictive algorithm training module 606. In many embodiments, predictive algorithm training module 606 can store computing instructions configured to run on one or more processing modules and perform one or more acts of method 400 (FIG. 4) (e.g., activity 406 (FIG. 4)).

In many embodiments, system 600 can comprise non-transitory memory storage module 607. Memory storage module 607 can be referred to as classification algorithm applying module 607. In many embodiments, classification algorithm applying module 607 can store computing instructions configured to run on one or more processing modules and perform one or more acts of method 400 (FIG. 4) (e.g., activity 406 (FIG. 4)).

In many embodiments, system 600 can comprise non-transitory memory storage module 608. Memory storage module 608 can be referred to as intent post-processing module 608. In many embodiments, intent post-processing module 608 can store computing instructions configured to run on one or more processing modules and perform one or more acts of method 400 (FIG. 4) (e.g., activity 408 (FIG. 4)).

In many embodiments, system 600 can comprise non-transitory memory storage module 609. Memory storage module 609 can be referred to as intent re-ranking module 609. In many embodiments, intent re-ranking module 609 can store computing instructions configured to run on one or more processing modules and perform one or more acts of method 400 (FIG. 4) (e.g., activity 409 (FIG. 4)).

In many embodiments, system 600 can comprise non-transitory memory storage module 610. Memory storage module 610 can be referred to as altered GUI displaying module 610. In many embodiments, altered GUI displaying module 610 can store computing instructions configured to run on one or more processing modules and perform one or more acts of method 400 (FIG. 4) (e.g., activity 410 (FIG. 4)).

Figure 7:
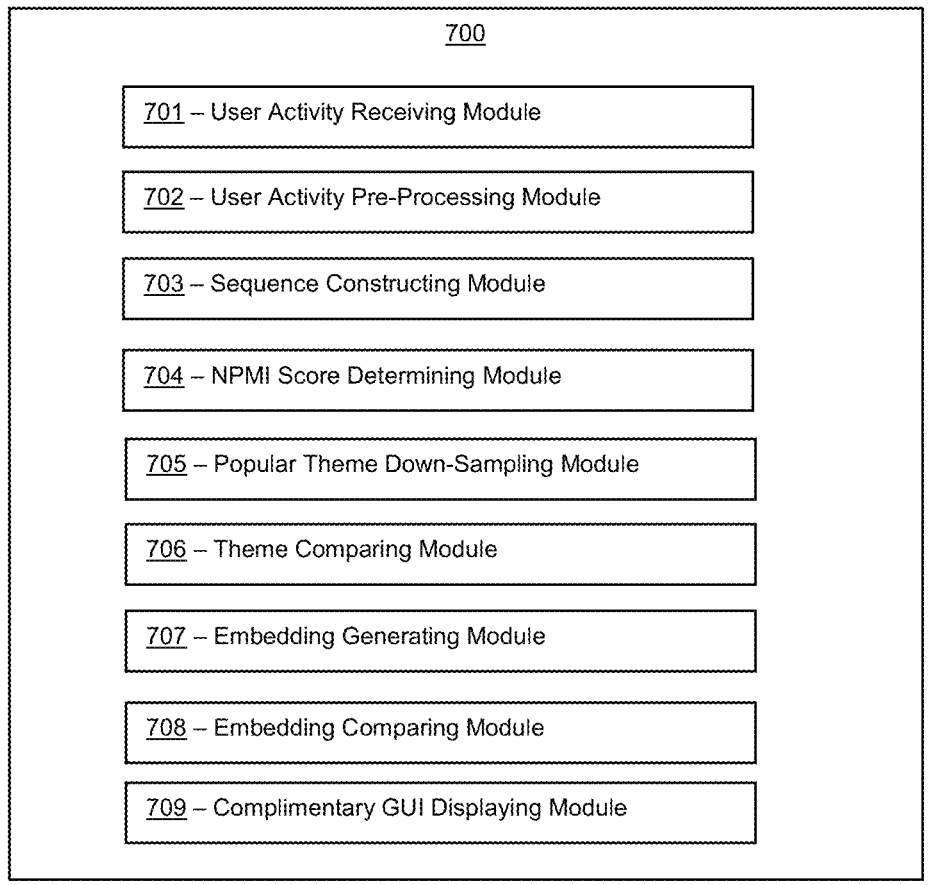
FIG. 7 illustrates a representative block diagram of a system, according to an additional embodiment.

Turning ahead in the drawings, FIG. 7 illustrates a block diagram of a system 700 that can be employed for altering a GUI. System 700 is merely exemplary and embodiments of the system are not limited to the embodiments presented herein. System 700 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 700. In many embodiments, system 700 (or a portion thereof) can be stored within web server 310 (FIG. 3) and/or user device 330 (FIG. 3).

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 700 can comprise non-transitory memory storage module 701. Memory storage module 701 can be referred to as user activity receiving module 701. In many embodiments, user activity receiving module 701 can store computing instructions configured to run on one or more processing modules and perform one or more acts of method 500 (FIG. 5) (e.g., activity 501 (FIG. 5)).

In many embodiments, system 700 can comprise non-transitory memory storage module 702. Memory storage module 702 can be referred to as user activity pre-processing module 702. In many embodiments, user activity pre-processing module 702 can store computing instructions configured to run on one or more processing modules and perform one or more acts of method 500 (FIG. 5) (e.g., activity 502 (FIG. 5)).

In many embodiments, system 700 can comprise non-transitory memory storage module 703. Memory storage module 703 can be referred to as sequence constructing module 703. In many embodiments, sequence constructing module 703 can store computing instructions configured to run on one or more processing modules and perform one or more acts of method 500 (FIG. 5) (e.g., activity 503 (FIG. 5)).

In many embodiments, system 700 can comprise non-transitory memory storage module 704. Memory storage module 704 can be referred to as NPMI score determining module 704. In many embodiments, NPMI score determining module 704 can store computing instructions configured to run on one or more processing modules and perform one or more acts of method 500 (FIG. 5) (e.g., activity 505 (FIG. 5)).

In many embodiments, system 700 can comprise non-transitory memory storage module 705. Memory storage module 705 can be referred to as popular theme down-sampling module 705. In many embodiments, popular theme down-sampling module 705 can store computing instructions configured to run on one or more processing modules and perform one or more acts of method 500 (FIG. 5) (e.g., activity 505 (FIG. 5)).

In many embodiments, system 700 can comprise non-transitory memory storage module 706. Memory storage module 706 can be referred to as theme comparing module 706. In many embodiments, theme comparing module 706 can store computing instructions configured to run on one or more processing modules and perform one or more acts of method 500 (FIG. 5) (e.g., activity 506 (FIG. 5)).

In many embodiments, system 700 can comprise non-transitory memory storage module 707. Memory storage module 707 can be referred to as embedding generating module 707. In many embodiments, embedding generating module 707 can store computing instructions configured to run on one or more processing modules and perform one or more acts of method 500 (FIG. 5) (e.g., activity 507 (FIG. 5)).

In many embodiments, system 700 can comprise non-transitory memory storage module 708. Memory storage module 708 can be referred to as embedding comparing module 708. In many embodiments, embedding comparing module 708 can store computing instructions configured to run on one or more processing modules and perform one or more acts of method 500 (FIG. 5) (e.g., activity 508 (FIG. 5)).

In many embodiments, system 700 can comprise non-transitory memory storage module 709. Memory storage module 709 can be referred to as complimentary GUI displaying module 709. In many embodiments, complimentary GUI displaying module 709 can store computing instructions configured to run on one or more processing modules and perform one or more acts of method 500 (FIG. 5) (e.g., activity 509 (FIG. 5)).

Although systems and methods for altering a GUI have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 4-5 may include different procedures, processes, and/or activities and be performed by many different modules, in many different orders. One or more of the procedures, processes, or activities of FIGS. 4-5 may include one or more of the procedures, processes, or activities of another different one of FIGS. 4-5. As another example, the components within system 300 (FIG. 3), system 600 (FIG. 6), and/or system 700 (FIG. 7) can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform functions comprising:
receiving in-session user activity entered into an initial graphical user interface (GUI) from a user electronic device of a user, wherein the in-session user activity comprises types of user interactions with one or more websites during a browsing session;
selectively aggregating the in-session user activity of the user with historical activity data of the user comprises sorting each in-session user activity of the user and each historical activity data of the user into one or more respective groups, wherein the one or more respective groups comprise a distribution of interaction counts in a categorization level of a hierarchical categorization scheme over a period of time;

predicting one or more intents of the user by inputting the in-session user activity of the user and the historical activity data of the user into a first set of predictive algorithms;
post-processing the one or more intents; and
coordinating displaying an altered GUI based on the one or more intents, as filtered.

2. The system of claim 1, wherein selectively aggregating the in-session user activity of the user and the historical activity data of the user comprises:
removing at least a portion of the historical activity data based on a user access portal of the in-session user activity.

3. The system of claim 2, wherein:
selectively aggregating the in-session user activity of the user and the historical activity data of the user further comprises:
creating a whitelist of actions; and
the at least the portion of the historical activity data does not include actions on the whitelist of actions.

4. The system of claim 1, wherein the first set of predictive algorithms comprises a machine learning algorithm.

5. The system of claim 1, wherein the first set of predictive algorithms comprises:
applying a multi-class classification algorithm to the in-session user activity of the user and the historical activity data.

6. The system of claim 1, wherein coordinating displaying the altered GUI comprises:
re-ranking the one or more intents, as filtered, into a re-ranked order; and
coordinating displaying GUI elements related to the one or more intents, as filtered and re-ranked, in the re-ranked order.

7. The system of claim 1, wherein post-processing the one or more intents comprises:
re-ranking the one or more intents based on a dot product of top ranked intents of the one or more intents.

8. The system of claim 1, wherein selectively aggregating the in-session user activity of the user with the historical activity data of the user further comprises:
weighting the in-session user activity of the user and the historical activity data of the user by price.

9. The system of claim 1, wherein the first set of predictive algorithms operate as a function of:
user features from complementary intents; and
learned weights of a model of intent type.

10. The system of claim 1, wherein the computing instructions, when executed on the one or more processors, further cause the one or more processors to perform a function comprising:
continually training the first set of predictive algorithms on the in-session user activity of the user and the historical activity data of the user as more data is gathered from a user session for the user.

11. A method implemented via execution of computing instructions configured to run at one or more processors and configured to be stored at non-transitory computer-readable media, the method comprising:
receiving in-session user activity entered into an initial graphical user interface (GUI) from a user electronic device of a user, wherein the in-session user activity comprises types of user interactions with one or more websites during a browsing session;
selectively aggregating the in-session user activity of the user with historical activity data of the user comprises sorting each in-session user activity of the user and each historical activity data of the user into one or more respective groups, wherein the one or more respective groups comprise a distribution of interaction counts in a categorization level of a hierarchical categorization scheme over a period of time;
predicting one or more intents of the user by inputting the in-session user activity of the user and the historical activity data of the user into a first set of predictive algorithms;
post-processing the one or more intents; and
coordinating displaying an altered GUI based on the one or more intents, as filtered.

12. The method of claim 11, wherein selectively aggregating the in-session user activity of the user and the historical activity data of the user comprises:
removing at least a portion of the historical activity data based on a user access portal of the in-session user activity.

13. The method of claim 12, wherein:
selectively aggregating the in-session user activity of the user and the historical activity data of the user further comprises:
creating a whitelist of actions; and
the at least the portion of the historical activity data does not include actions on the whitelist of actions.

14. The method of claim 11, wherein the first set of predictive algorithms comprises a machine learning algorithm.

15. The method of claim 11, wherein the first set of predictive algorithms comprises:
applying a multi-class classification algorithm to the in-session user activity of the user and the historical activity data.

16. The method of claim 11, wherein coordinating displaying the altered GUI comprises:
re-ranking the one or more intents, as filtered, into a re-ranked order; and
coordinating displaying GUI elements related to the one or more intents, as filtered and re-ranked, in the re-ranked order.

17. The method of claim 11, wherein post-processing the one or more intents comprises:
re-ranking the one or more intents based on a dot product of top ranked intents of the one or more intents.

18. The method of claim 11, wherein selectively aggregating the in-session user activity of the user with the historical activity data of the user further comprises:
weighting the in-session user activity of the user and the historical activity data of the user by price.

19. The method of claim 11, wherein the first set of predictive algorithms operate as a function of:
user features from complementary intents; and
learned weights of a model of intent type.

20. The method of claim 11, further comprising:
continually training the first set of predictive algorithms on the in-session user activity of the user and the historical activity data of the user as more data is gathered from a user session for the user.

\* \* \* \* \*